Dec. 9, 1941.    T. W. PAUL ET AL    2,265,971
PUMP
Filed Nov. 7, 1938
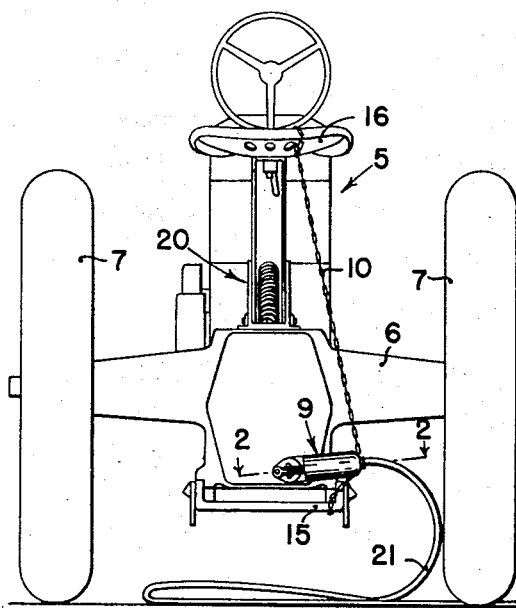
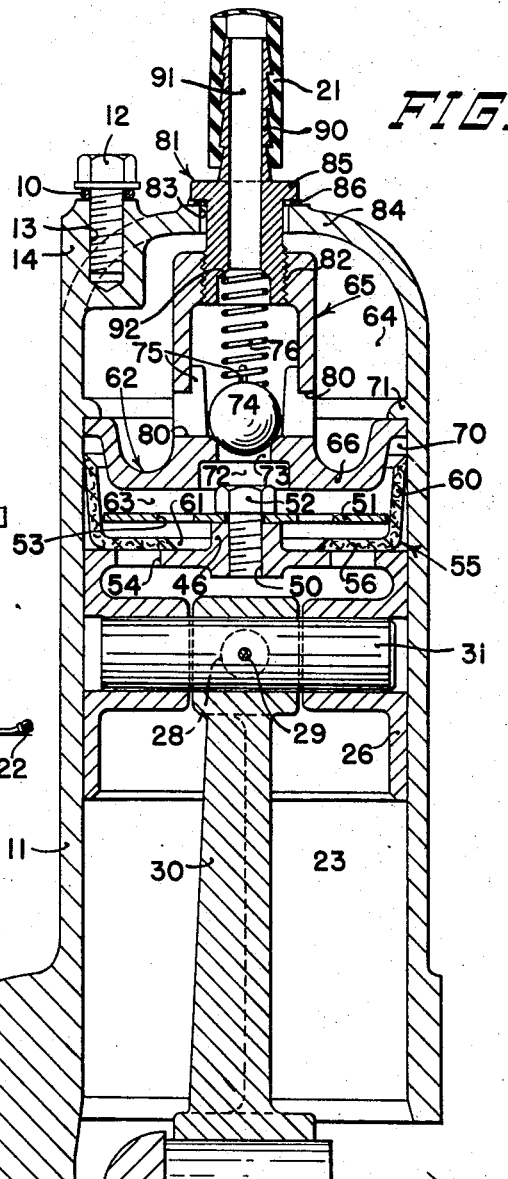
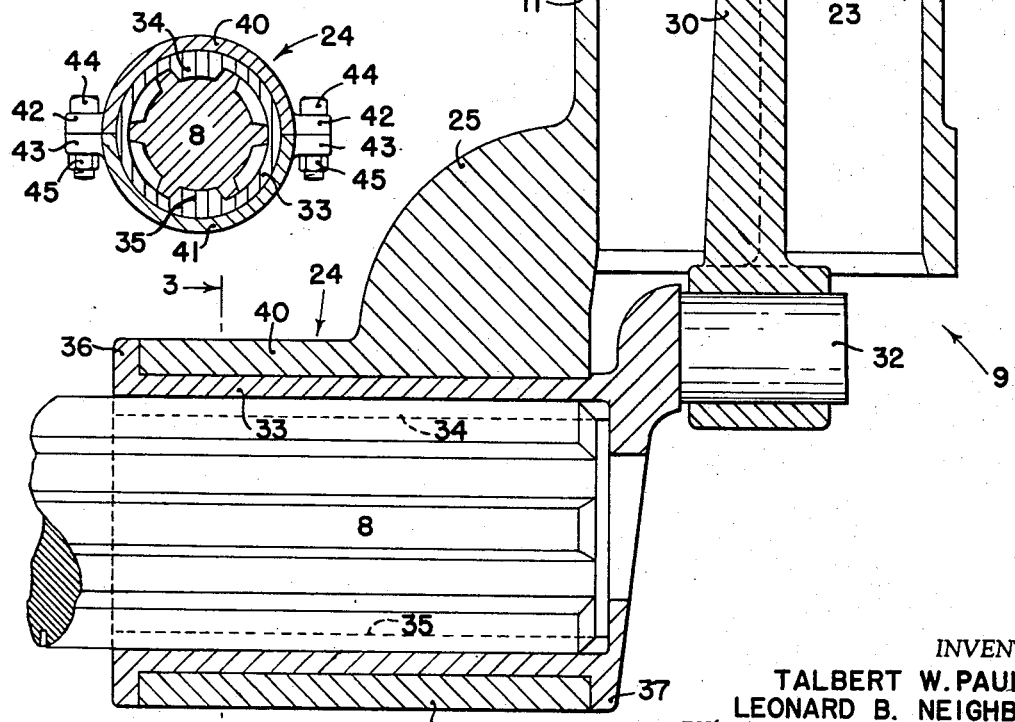
INVENTOR.
TALBERT W. PAUL.
LEONARD B. NEIGHBOUR.
ATTORNEYS Patented Dec. 9, 1941

2,265,971

UNITED STATES PATENT OFFICE 2,265,971

PUMP

Talbert W. Paul and Leonard B. Neighbour, Moline, Ill., assignors to Deere & Company, Moline, Ill., a corporation of Illinois Application November 7, 1938, Serial No. 239,262

18 Claims. (Cl. 230—190)

The present invention relates generally to appliances for motor vehicles and more particularly to a portable air pump for temporary attachment to the existing power take-off shaft of a rubber-tired tractor for furnishing air for the tires.

With the increasing use of pneumatic tires on farm implements of all kinds, and particularly of the large size tires on tractors, the problem of keeping these tires properly inflated has become more and more acute. The great majority of all farms are remote from roadside air pump facilities and it becomes necessary either to take the tire in a truck for many miles to the nearest service station having air under pressure, or to pump the tire up by hand—an extremely arduous task. A great majority of tractors are constructed with a power take-off shaft projecting from the transmission mechanism, however, and this provides a convenient point of connection to which an air pump might be connected. As this shaft is used for other service, the pump must be readily attachable and detachable.

The principal object of the present invention, therefore, is to provide a new and improved portable air pump which can be temporarily attached to the existing power take-off shaft of a tractor for the purpose of inflating pneumatic tires.

Another object is to provide an improved intake valve of novel design for an air pump of the class described above.

A further object of the present invention is to provide means for smoothing out the pressure pulsations, thereby reducing the excessive stresses in the air hose and lessening the tendency of the latter to heat up during prolonged operation.

Still another object relates to the simplification of the pump structure by supporting it entirely on a bearing on the power take-off shaft and merely tying it to the tractor body to prevent the pump housing from rotating with the shaft during operation. More specifically, it is an object of our invention to provide means for holding the pump against turning while providing for yieldingly absorbing vibration but securing the pump against bodily swinging in either direction of rotation.

These and other objects and advantages of the present invention will become apparent after a consideration of the following detailed description of a preferred embodiment thereof, reference being had to the appended drawing, in which Figure 1 is a rear view of a rubber-tired tractor showing a tire pump embodying the principles of our invention mounted on the power take-off shaft;

Figure 2 is a sectional view, drawn to enlarged scale, taken substantially along the line 2—2 in Figure 1; and Figure 3 is a partial section, drawn to reduced scale, as viewed from the line 3—3 in Figure 2.

Referring now to the drawing, reference numeral 5 indicates a tractor having a rear axle housing 6 carried on a pair of laterally spaced rubber-tired driving wheels 7. A power take-off shaft 8 projects rearwardly from the lower portion of the rear axle housing 6 and is suitably connected to and driven by the tractor engine in a manner well known in the art.

The tire pump embodying the principles of our invention is indicated in its entirety by the reference numeral 9 and is shown mounted on the end of the power take-off shaft 8 in operating position. As the pump is substantially entirely supported by the power take-off shaft, it must be held stationary during operation to prevent it from rotating with the shaft. To this end a chain 10 is secured intermediate its ends to the housing 11 of the pump by means of a bolt 12 screwed into a threaded aperture 13 in a lug 14 provided at the outer end of the housing. One end of the chain 10 is suitably attached to a rigid portion of the tractor body, such as the drawbar 15, while the other end is fastened to the driver's seat 16. The seat 16 is yieldingly mounted on a spring suspension 20, and by sitting on the seat or pulling it down before fastening the chain 10, the latter is pulled tight when the seat is released supplying an initial spring pressure against the pump housing 11, thereby firmly restraining the latter against rotation with the power take-off shaft 8, while it is cushioned against vibration by the action of the spring 20. The pump is provided with a flexible air hose 21 having an air chuck 22 which is adapted to connect to the standard valve stem with which most present day pneumatic tires are equipped.

The pump 9 comprises the housing 11, which preferably includes a compression cylinder 23 having one end thereof closed and a mounting sleeve bracket 24 formed integral with the cylinder wall at the other end thereof, the axis of the sleeve 24 being disposed perpendicular to the axis of the cylinder 23. The cylinder 23 and sleeve 24 are connected and braced by suitable webbing 25 for added strength. A piston 26 is slidably disposed within the cylinder 23 and is actuated by a connecting rod 30 to which it is pivotally attached by a wrist pin 31. The wrist pin 31 is passed through aligned openings in the piston and connecting rod and is secured to the latter by means of a cotter pin 29 which extends through aligned holes in the connecting rod and wrist pin. To facilitate assembly, the piston is provided with enlarged openings 28 disposed co-axial with the cotter pin holes, and the cotter pin 29 is inserted into place through one of the openings 28 and spread by means of a tool inserted through the other opening 28. The lower end of the connecting rod 30 is connected to a crank pin 32 which is formed integral with a driving sleeve 33 journaled within the bracket sleeve 24. The interior of the driving sleeve 33 is provided with a pair of diametrically opposite splines 34 and 35 adapted to cooperate with corresponding keyways in the splined power take-off shaft 8, and the ends of the sleeve 33 are formed with shoulder flanges 36 and 37 abutting the end of the sleeve 24 to provide end thrust bearings therefor. For the purpose of facilitating assembly, the sleeve bracket 24 is split into two hemi-cylindrical parts 40 and 41 having two pairs of cooperating lugs 42 and 43 which are held together by bolts 44 and nuts 45, as shown in Figure 3.

The head of the piston 26 is provided with a centrally located raised boss 46 and clamped to the top of this boss is a circular disk retainer 51 of somewhat smaller diameter than the inside diameter of the cylinder 23. A bolt 52 is passed through an opening in the center of the disk 51 and is screwed into a threaded aperture 50 in the boss 46 to secure the disk 51 rigidly thereto. The disk 51 is provided with a number of openings 53 arranged in a small circle about the bolt 52, and the piston head is likewise provided with a circle of holes 54, the latter circle having a somewhat larger diameter than the former so that holes 54 are offset outwardly from holes 53. A cup-shaped washer seal 55 of resilient material such as leather or the like is disposed with its radially extending flange portion 56 in the space between the piston head and disk 51 and adapted to cover the holes 54 when seated against the piston head. The skirt portion 60 of the seal extends upwardly through the space between the outer edge of the disk 51 and the cylinder wall and bears against the latter. The washer seal 55 fits loosely within its confines and is free to move up and down between the disk 51, and piston head as the piston 26 is reciprocated. On the down stroke, or suction stroke of the piston, the friction of the washer skirt 60 against the walls of the cylinder 23, together with the atmospheric air pressure on the under side of the radial flange portion 56 cause the washer seal to bear upwardly against the disk 51, opening the holes 54 and allowing air to flow through the central opening 61 in the washer and the holes 53 in the disk into the cylinder space 63 above the piston. The disk 51 thus acts as a retainer, engaging the seal 55 to move it with the piston. On the up stroke, or compression stroke of the piston, the drag of the washer skirt 60 aided by the pressure of the compressed air on the upper side of the radial flange portion 56, causes the washer seal 55 to bear downwardly against the piston head and close the holes 54, effectively sealing the piston 26 against leakage of air. Both the inner and outer peripheral edges of the washer seal 55 are beveled, as is customary, to secure the most effective seal.

The upper portion of the cylinder 23 is divided by a partition member 62 into a compression chamber 63 between the piston 26 and member 62, and an equalizing or pulsation chamber 64 above the partition 62, the purpose of the pulsation chamber 64 being to smooth out the pressure pulsations and provide a reservoir for holding a limited quantity of air under relatively high pressure and feeding the same into the hose 21 during the down stroke of the piston. This eliminates the excessive instantaneous pressures which would be built up in the air hose if the latter were connected directly to the compression chamber, and greatly lessens the tendency of the air hose to heat up.

The partition member 62 includes a ball check valve cage 65 and a radial flange 66 extending outwardly from the lower end thereof, said flange being turned up adjacent the cylinder wall to provide an annular recess 70 into which the washer skirt 60 extends when the piston is in its uppermost position. The outer edge of the flange 66 engages an abutment comprising a shoulder 71 formed on the cylinder wall and is drawn tightly thereagainst by means to be described presently for the purpose of securing an air tight seal between the compression chamber 63 and pulsation chamber 64. A recess 72 is provided in the center of the partition member 62 to receive the head of the bolt 52 when the piston is at the top of its stroke, and connecting the recess 72 with the pulsation chamber 64 is a cylindrical passageway 73 which is beveled around its upper edge to provide a seat for the ball check valve 74. Guide flanges 75 are provided in the valve cage 65 to hold the ball check valve 74 against lateral displacement and ensure that the latter seats properly each time, and a compression spring 76 bears downwardly upon the ball 74 to hold it yieldingly against its seat. A number of openings 80 in the valve cage 65 adjacent the ball check valve 74 allow the air to flow freely from the valve cage to the pulsation chamber or from pulsation chamber back through the valve cage and out through the air hose 21.

The valve cage 65 is connected with the air hose 21 by means of a connecting plug 81 which also serves to clamp the partition member 62 against the shoulder 71. The lower end of the plug 81 is threaded at 82 and this threaded portion is inserted through an aperture 83 in the cylinder head 84 and is screwed into a threaded aperture formed in the valve cage 65. A flange 85 on the plug 81 bears against the top of the cylinder head 84 limiting the depth to which the plug can be inserted into the cylinder and causing the plug 81 to draw the partition member 62 upwardly against the shoulder 71 when screwed up tight. The joint between the flange 85 and cylinder head 84 is sealed air tight by any suitable gasket 86.

Formed integral with the connecting plug 81 and extending outwardly therefrom is a serrated nipple 90 which is adapted to be inserted into the end of the air hose 21. A passage 91 extends the entire length of the nipple 90 and plug 81 and is enlarged at its lower end where it opens into the valve cage 65 to provide a shoulder 92 against which the upper end of the spring 76 bears.

During operation, the piston 26 is reciprocated in the cylinder 23. On the suction stroke, the spring 76 holds the ball check valve 74 closed, while the cupped washer 60 bears against the disk 51, allowing air to flow through the ports 54 and 53. During the compression stroke, the washer 60 covers the ports 54, compressing air in the compression chamber until the force of the valve spring 76 plus the pressure of air above the valve 74 is overcome, whereupon the valve 74 is opened and the compressed air is forced into the chamber 64 and through the passage 91. At the end of the compression stroke, the ball 74 is reseated, retaining the compressed air.

What we claim as our invention is:

1. An air pump for a vehicle having a body and a power take-off shaft extending outwardly therefrom comprising, in combination, a pump housing having a cylinder and compression chamber, a piston slidably disposed within said cylinder, operating connection between said power take-off shaft and said piston, means connecting said housing with said tractor to restrain rotative movement therebetween, and valve means comprising a retainer member fixed to said piston and spaced longitudinally from one end thereof, said retainer member having an aperture opening into said compression chamber and said one end of the piston having an aperture opening into the atmospheric air, seal means disposed in the space between said piston and said retainer member and bodily slidable therein along the axis of the piston to close one of said apertures when said piston travels in one direction and to open said one aperture when the piston travels in the other direction, and means for so sliding said seal means when said piston reciprocates.

2. Inlet valve means for a reciprocating pump having a cylinder and a piston movable therein, said piston having a valve aperture in the head thereof, comprising an annular valve member disposed within the compression chamber of the pump and slidable bodily toward and away from said piston, said valve member having a skirt portion disposed generally parallel to the direction of movement of the piston and adapted to contact the cylinder wall and a radially extending flange portion adapted to cover and seal said aperture when the piston is moving in its pressure stroke, and a retainer fixed to the piston head and engageable with the valve member when the piston is moving in its intake stroke to move the valve member along with the piston, said retainer being spaced from the piston to provide some lost motion between said valve member and said piston, thus providing a passage under said flange portion to permit fluid to flow through said aperture and under said flange portion into the cylinder during the intake stroke of the piston.

3. A pump comprising, in combination, a cylinder, a reciprocating piston disposed within said cylinder and having an aperture in the head thereof, a valve member carried by said piston and having a radial flange portion with an opening therein offset from said piston aperture, said radial flange portion being adapted to cover and seal said aperture when the piston is moving in its pressure stroke, and a retainer fixed to the piston and spaced axially from the head end thereof, said valve member being bodily slidable within the space limited by the piston head and retainer between a closed position in engagement with the piston head and an open position in engagement with the retainer, said retainer having an aperture adapted to register with the opening in said radial flange to provide a passage for the flow of fluid through the apertures in the piston and retainer and into the cylinder when the piston is moving in its intake stroke.

4. Valve means for an air compressor piston comprising, in combination, a retainer member fixedly secured to the piston head in a manner to provide a recess between the piston head and retainer, said retainer and said piston having offset apertures provided therein, and a valve member disposed within said recess between the piston head and retainer, said valve member being bodily slidable along the axis of the piston to cover the aperture in the piston head when said piston travels in one direction and to uncover said aperture when said piston travels in the other direction.

5. In combination with a cylinder having a compression chamber and a piston movable within said cylinder, valve means comprising a circular disk of somewhat smaller diameter than said piston, means for fixedly securing said disk to the piston in axially spaced relation to the head thereof, said disk having a plurality of holes spaced substantially equidistant from the center thereof and opening into said compression chamber, said piston head having a plurality of holes offset radially from the holes in said disk and opening into said cylinder opposite from said compression chamber, and a cup-shaped washer seal having a radial flange portion disposed in the space between the piston head and said disk and a skirt portion extending between the outer edge of said disk and the cylinder wall, said washer seal being bodily slidable axially of the piston to close the holes in said piston head on the compression stroke of said piston and to open said holes on the suction stroke of said piston.

6. A compressor pump comprising a cylinder having an abutment formed thereon, a piston slidably disposed within said cylinder, a check valve housing disposed within said cylinder between said piston and said abutment to form a compression chamber above the piston, and means acting against said cylinder and reacting against said valve housing for holding the latter tightly against said abutment.

7. A compressor pump comprising a cylinder having a cylinder head at one end thereof, an abutment formed on the inner wall of said cylinder, a partition member disposed within said cylinder and engageable with said abutment on the side opposite said cylinder head to divide said cylinder into two chambers, check valve means connecting said chambers, and means engageable with said cylinder head and in threaded engagement with said partition member for drawing the latter tightly against said abutment to form a gas tight seal.

8. A compressor pump comprising a cylinder having a cylinder head with an aperture formed therein, an abutment formed on the inner wall of said cylinder, a partition member disposed within said cylinder and engageable with said abutment to enclose a pulsation chamber in the space between the partition and the cylinder head, a reciprocating piston disposed within said cylinder and enclosing a compression chamber in the space between the piston head and partition member, check valve means in the partition member connecting said compression chamber with said pulsation chamber, and an outlet connection extending through said cylinder head aperture and threaded into said partition member, said outlet connection having means abutting against said cylinder head whereby said partition member is drawn upwardly against said cylinder wall abutment when the outlet connection is screwed into said partition member.

9. A pump comprising a cylinder having an integral cylinder head with an aperture formed in the center thereof, a shoulder formed on the inner wall of said cylinder, a partition member disposed within said cylinder and engageable with said shoulder to form a pulsation chamber in the cylinder head end of said cylinder, a reciprocating piston disposed in the cylinder below said partition member and co-acting with the latter to form a compression chamber, a ball check valve cage formed integral with said partition member and containing check valve means connecting said compression chamber with said pulsation chamber, and a discharge connection extending through said cylinder head aperture and having a threaded portion adapted to be threaded into said valve cage, said discharge connection having a radial flange adapted to bear against the margin of said cylinder head aperture and thereby exert a force upon said partition member holding the latter in abutment against said cylinder wall shoulder.

10. A compressor pump comprising a cylinder having a shoulder formed around the inner wall thereof and a cylinder head at one end thereof, a partition member disposed within said cylinder and bearing against said shoulder, said cylinder being divided into a pulsation chamber comprising the space between said partition member and said cylinder head and a compression chamber on the opposite side of said partition member, a reciprocating piston disposed within said compression chamber, a ball check valve contained in said partition member and connecting said compression chamber with said pulsation chamber, a connecting plug extending through said cylinder head and threaded into said partition member, said connecting plug having a flange adapted to bear against said cylinder head to draw said partition member against said shoulder, and means for connecting said plug with a discharge hose, said plug and hose connecting means having a passage extending therethrough and opening into said pulsation chamber.

11. A compressor pump comprising a cylinder, a reciprocating piston disposed within said cylinder and having a valve aperture in the head thereof, a retainer fixed to said piston and spaced longitudinally from the piston head, and a valve member comprising a radial flange portion disposed within the space between said retainer and said piston head and a skirt portion disposed generally parallel in the direction of movement of the piston and adapted to contact the cylinder wall, said valve member being bodily slidable lengthwise of the cylinder between a closed position in contact with said piston and an open position in contact with said retainer, said valve member being moved from one position to the other by friction of said skirt against said cylinder as the piston is reciprocated.

12. A compressor pump comprising a cylinder, a reciprocating piston disposed within said cylinder and having a valve aperture in the head thereof, a retainer fixed to said piston and having a radially extending portion spaced axially from the piston head, an annular valve seal disposed in the space between said piston head and said retainer portion and bodily slidable therein between a position flat against said piston and a second position abutting against said retainer, said seal being adapted to close said aperture in said first mentioned position and to open said aperture in said second position, and means responsive to relative sliding movement between said piston and cylinder for causing said seal to assume said first position during the pressure stroke of said piston and said second position during the intake stroke of the piston.

13. A compressor pump comprising a cylinder, a reciprocating piston disposed within said cylinder and having a valve aperture in the head thereof, a retainer fixed to said piston in a manner to provide an annular recess between the retainer and the piston head, and a resilient seal disposed within said annular recess and axially slidable therein to cover and uncover said valve aperture, said seal having frictional engagement with the cylinder walls for effecting sliding movement of the seal within the limits of said recess when said piston is reciprocated.

14. In combination, a cylinder having an integral cylinder head at one end thereof provided with an aperture, an abutment formed on the inner wall of said cylinder, a partition member disposed within said cylinder and engageable with the side of said abutment opposite said cylinder head, and a connecting plug having a rim portion bearing against the cylinder head and a center portion extending through said aperture and threaded into said partition member for clamping the partition member tightly against said abutment.

15. A pump comprising a cylinder having an integral cylinder head with an aperture in the center thereof, a shoulder formed on the inner wall of said cylinder, a partition member disposed within said cylinder and engageable with said shoulder to form a pulsation chamber in the head end of the cylinder, a reciprocating piston disposed in the cylinder below said partition member and co-acting with the latter to form a compression chamber, check valve means connecting said compression chamber with said pulsation chamber, and a clamping member extending through said cylinder head aperture and having a threaded portion adapted for threaded engagement with said partition member, said clamping member engaging the margin of said cylinder head aperture whereby a force can be exerted upon said partition member to hold the latter in abutment with said shoulder.

16. A compressor pump comprising a cylinder having a head with an aperture formed therein, an abutment formed on the inner wall of said cylinder, a partition member disposed within said cylinder and engageable with said abutment to enclose a pulsation chamber in the space between the partition and the cylinder head, and a connecting member extending through said cylinder head aperture and having threaded engagement with said partition member, said connecting member having a radial flange bearing against the outer surface of the cylinder head adjacent the aperture.

17. A compressor pump comprising a cylinder having a head at one end thereof provided with an aperture, a shoulder formed on the inner wall of the cylinder, a partition member disposed within the cylinder and engaging the side of said shoulder opposite the cylinder head, a connecting plug extending through said cylinder head aperture and having threaded engagement with the partition member, means on the connecting plug engaging the cylinder head to draw said partition member against the shoulder, and means for connecting a discharge hose with said connecting plug, said plug and hose-connecting means having a passageway formed therein communicating with the inside of the cylinder, 18. A compressor pump comprising a cylinder having an annular shoulder formed on the inner wall thereof, a partition member disposed within the cylinder on one side of said shoulder, a connecting member threaded into said partition member and engaging the cylinder on the other side of the shoulder to draw the partition member against the shoulder, said connecting member and said partition member being formed to provide a continuous passageway extending from the inside of the cylinder to the outside thereof, and means communicating with said passageway for connecting a discharge hose to said connecting member.

TALBERT W. PAUL.
LEONARD B. NEIGHBOUR.